US009512637B2

(12) United States Patent
Ramsauer (10) Patent No.: US 9,512,637 B2
(45) Date of Patent: Dec. 6, 2016

(54) SNAP FASTENER (76) Inventor: Dieter Ramsauer, Schwelm (DE)

(*) Notice: Subject to any disclaimer, the term of this patent is extended or adjusted under 35 U.S.C. 154(b) by 1041 days.

(21) Appl. No.: 12/596,702

(22) PCT Filed: Jun. 6, 2007

(86) PCT No.: PCT/EP2007/004992
§ 371 (c)(1),
(2), (4) Date: Nov. 17, 2009

(87) PCT Pub. No.: WO2008/128560
PCT Pub. Date: Oct. 30, 2008

(65) Prior Publication Data
US 2010/0135721 A1    Jun. 3, 2010

(30) Foreign Application Priority Data
Apr. 24, 2007   (DE) .................... 20 2007 005 983 U (51) Int. Cl.
| E05B 9/08 | (2006.01) |
| A47B 91/02 | (2006.01) |
| F16B 5/06 | (2006.01) |
| F16B 19/10 | (2006.01) |
| F16B 21/08 | (2006.01) |
| E05B 1/00 | (2006.01) |

(52) U.S. Cl.
CPC ............ *E05B 9/084* (2013.01); *A47B 91/022* (2013.01); *E05B 1/0015* (2013.01); *F16B 5/0642* (2013.01); *F16B 19/109* (2013.01); *F16B 21/086* (2013.01); *Y10T 403/75* (2015.01)

(58) Field of Classification Search
USPC ...... 403/408.1, 238–240, 247–252; 411/347, 411/348, 27; 24/458, 456
See application file for complete search history.

(56) References Cited

U.S. PATENT DOCUMENTS

| 4,422,222 A | * | 12/1983 | Notoya .......................... 24/614 |
| 4,627,760 A | * | 12/1986 | Yagi et al. .................... 403/201 |
| 5,435,159 A | | 7/1995 | Ramsauer |

(Continued)

FOREIGN PATENT DOCUMENTS

| AT | 398815 | 2/1995 |
| DE | 10122125 | 9/2002 |

(Continued)

*Primary Examiner* — Daniel P Stodola
*Assistant Examiner* — Jonathan Masinick
(74) *Attorney, Agent, or Firm* — Frommer Lawrence & Haug LLP (57) ABSTRACT

A snap fastener which secures a first thin wall with a through-opening. A base part includes a plate which overlaps the longitudinal edges of the through-opening. A head part is provided as a housing with fastening projections such as fastening cams or leaf spring devices having flexible fastening surfaces. The housing is snapped into the through-opening so that it grips only the first thin wall. Unlocking devices are provided in the housing, via which the push elements can be pulled back into the housing from the front, and the housing can be disengaged from the other thin wall (e.g., a wall support). The dimensions between (1) the holding area of the fastening projections and the push members, and (2) the supporting plane of the base part are selected in such a way that, when the push elements are pulled back, the fastening projections lie on the front panel with clearance.

21 Claims, 11 Drawing Sheets (56) References Cited

U.S. PATENT DOCUMENTS

| | | | | |
|---|---|---|---|---|
| 6,722,711 | B2 * | 4/2004 | Kitzis | 292/145 |
| 7,002,523 | B2 * | 2/2006 | Noro | 343/713 |
| 7,088,297 | B2 * | 8/2006 | Nakano et al. | 343/713 |
| 7,600,794 | B2 * | 10/2009 | Ramsauer | 292/163 |
| 7,690,083 | B2 * | 4/2010 | Ramsauer | 16/382 |
| 7,798,740 | B2 * | 9/2010 | Kaufman | 403/408.1 |
| 8,001,656 | B2 * | 8/2011 | Ramsauer | 16/416 |

FOREIGN PATENT DOCUMENTS

| | | | | |
|---|---|---|---|---|
| DE | 20 2004 016009 | | 2/2006 | |
| WO | WO 2005071199 | * | 8/2005 | E05D 5/02 |
| WO | WO 2005083275 A1 * | | 9/2005 | F16B 5/06 |

* cited by examiner

SNAP FASTENER

The present application claims priority from PCT Patent Application No. PCT/EP2007/004992 filed on Jun. 6, 2007, which claims priority from German Patent Application No. 20 2007 005 983.3 filed on Apr. 24, 2007, the disclosure of which is incorporated herein by reference in its entirety.

BACKGROUND OF THE INVENTION

1. Field of the Invention

The invention is directed to a snap fastener suitable for securing a first thin wall such as a housing wall, door leaf, shutter, or the like, which is provided with a through-opening to a second thin wall such as thin-walled wall supports such as housing frames, door frames, wall opening edge, or the like, which is likewise provided with a through-opening, with a base part which can be arranged at the first (or second) thin wall in the through-opening thereof, with a head part extending away from this base part, this head part having a diameter which initially increases and then decreases again in its longitudinal section from the end of the head part in direction of the base part, which head part presents a male plug-in piece which, by overcoming a spring force acting radially outward in direction of the diameter, can be received by an undercut female insertion piece which is formed by or supported by the through-opening of the thin wall, wherein the head part presents a guide or a channel for one or two or more push elements or holding elements which are pressed by at least one spring into a position in which they project over the end of the guide or channel, the ends of which push elements or holding elements projecting out of the guide or the channel have a triangular shape in a projection line extending perpendicular to the thin wall, wherein the base part is formed by a plate overlapping the longitudinal edges of the through-opening in the thin wall, wherein the head part is provided as a housing with fastening projections such as fastening cams (of flexible material) or leaf spring devices having flexible fastening surfaces, which housing can be snapped into a through-opening in one thin wall in such a way that it grips only the one thin wall and that unlocking devices (releasing means) are provided in the housing, by means of which unlocking devices the push elements can be pulled back into the housing from the front and the housing can be disengaged from the other thin wall.

2. Description of Related Art

A snap fastener of the type mentioned above is already known from DE 20 2004 016 009 U1 (see claim 1 and FIGS. 35 to 40C). It is stated in paragraphs [0148] and [0157] that metal panels can be connected to one another by means of the arrangement known from this reference (i.e., the connection element can serve as a substitute for a weld connection), which can lead to discoloration, or for a screw connection or for rivet connections. The snap-in connection can also be used where the back side is difficult to access.

Snap fasteners of this kind which serve as fastening means are also described in the book "D-SNAP technology" (The installation system without screws or tools, innovative fastening for industrial panel processing, Verlag Moderne Industrie, by Ulrich Poestgens, 2006), pages 56 to 60.

In connection with the snap fastening as connection part, it is mentioned that the essential characteristics of a snap fastening in connecting panels to one another particularly include the automatic clamping of the snap elements behind the edges of the installation openings of the two panels and a snug fit in the installation opening. Based on these characteristics, snap fastenings ensure a fixed, vibration-free connection of two (or more) thin walls such as panels. They can be used, for example, to fasten side walls or rear walls to the frame section of a switch cabinet or housing, or to fasten a cover to a panel, or to fasten printed circuit boards to board supports.

A maximum clearance of 0.15 mm between the installation opening and snap fastener is required to ensure that the snap fastener can be inserted through the installation opening without difficulty. Therefore, in theory, there can be a minimal torsion of the panels relative to one another. However, this play can be reduced or entirely eliminated by using two snap fasteners and/or arranging them in the edge area.

Further, it is stated therein that this snap technology offers an alternative to captive screws. When electronic devices are mounted in housings (e.g., server racks), there is a risk that small parts will be lost and cause damage (e.g., by short circuiting in electronic equipment). This led to the development of so-called "captive screws". With these captive screws, the actual screw fits in a sleeve that is riveted in the outer panel. The inner panel must have a thread cut into it into which the screw can be screwed. If the screw comes loose, it remains anchored in the outer panel thanks to the fixed sleeve and cannot be lost. Disadvantages of captive screws include their high price and very time-consuming installation due to the riveting process. Further, captive screws cannot be easily removed again.

A snap fastener with a total of four snap elements replaces captive screws of this kind. While two opposite snap elements (see the above-cited German Utility Model, FIG. 40A, structural component 1337) produce the fixed connection to the outer panel, the two other opposite snap elements 1322 engage behind the inner panel and can be pulled back by means of an actuating device 43. When disassembled, the captive snap fastener remains fixed in the outer panel due to this design but, in contrast to the above-described screw sleeve for the captive screws, can be disassembled again in a simple manner when required. The snap elements for the fixed connection to the outer individual panel have a much smaller clamping area than those to be opened which must engage behind two panels. Therefore, the installation opening of the inner panel requires cutouts so that the snap elements which fit securely in the outer panel do not slip back through the inner panel into the channels and come loose (see FIG. 38B and FIG. 39B in the Utility Model).

However, when captive screws are replaced by snap technology it has turned out that the removal of a wall held by these snap fastening elements presents difficulties when used a number of times. This is because the plurality of snap fastening elements cannot be exactly aligned simultaneously in such a way that they release the wall simultaneously.

SUMMARY OF THE INVENTION

Problems arise when a snap connection of the type mentioned above is to be loosened again and when the back of the rear panel is not accessible or when a plurality of fastening elements hold the panels simultaneously because it is difficult to align all of the holding elements simultaneously in such a way that they can be disengaged.

It is the object of the invention to improve the snap fastener of the type mentioned above in such a way that this set of problems does not arise and a connection can also be disengaged again in a simpler manner than was possible heretofore in the prior art.

The problem is solved according to the invention in that the dimensions between the holding surfaces of the fastening projections and those of the push members on one hand and the supporting plane of the base part on the other hand are selected in such a way that when the push elements are pulled back the fastening projections lie on the front panel with play so that the individual snap fasteners can be pulled out successively until the rear panel is no longer held and can be removed in its entirety.

It is advantageous when the unlocking means (releasing means) lock in the open position.

According to a further development of the invention, the clearance in the length of the wall is configured in such a way that it corresponds at least to the thickness of the wall.

According to a further development of the invention, the through-openings in the two thin walls form guide surfaces which cooperate with projections of the housing to align the thin walls.

The guide surfaces preferably lie parallel with and at a distance from the movement direction of the plates.

The projection can be formed by a guide rib. Alternatively, the projection can be a recess. According to another alternative, the projection can be formed by the side wall of the housing.

The releasing means can be formed by an actuating pin which is rotatably mounted in the base part. In particular, the actuating pin can have a receptacle for an actuating tool such as a screw driver or socket wrench.

However, the actuating pin can also comprise a knurled actuating device.

The actuating pin can form a blade which is held in the unlocking position by a top dead center cam path in the unlocking position.

The base part can form a grip for pulling. The base part can be deformed with the head part.

The head part can also be formed integral with the base part by injection molding from plastic.

The leaf spring device can have a U-shape which engages around the head part and is riveted or screwed to the head part by the base of the "U".

BRIEF DESCRIPTION OF THE DRAWINGS

FIG. 6D shows a top view of the head part;

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figures 1A, 1B, 2, 3A, 3B, 3C, 4A, 4B, 5, 6A, 6B, 6C, 6E, 7A, 7B, 8A, 8B, 9A, 9B:
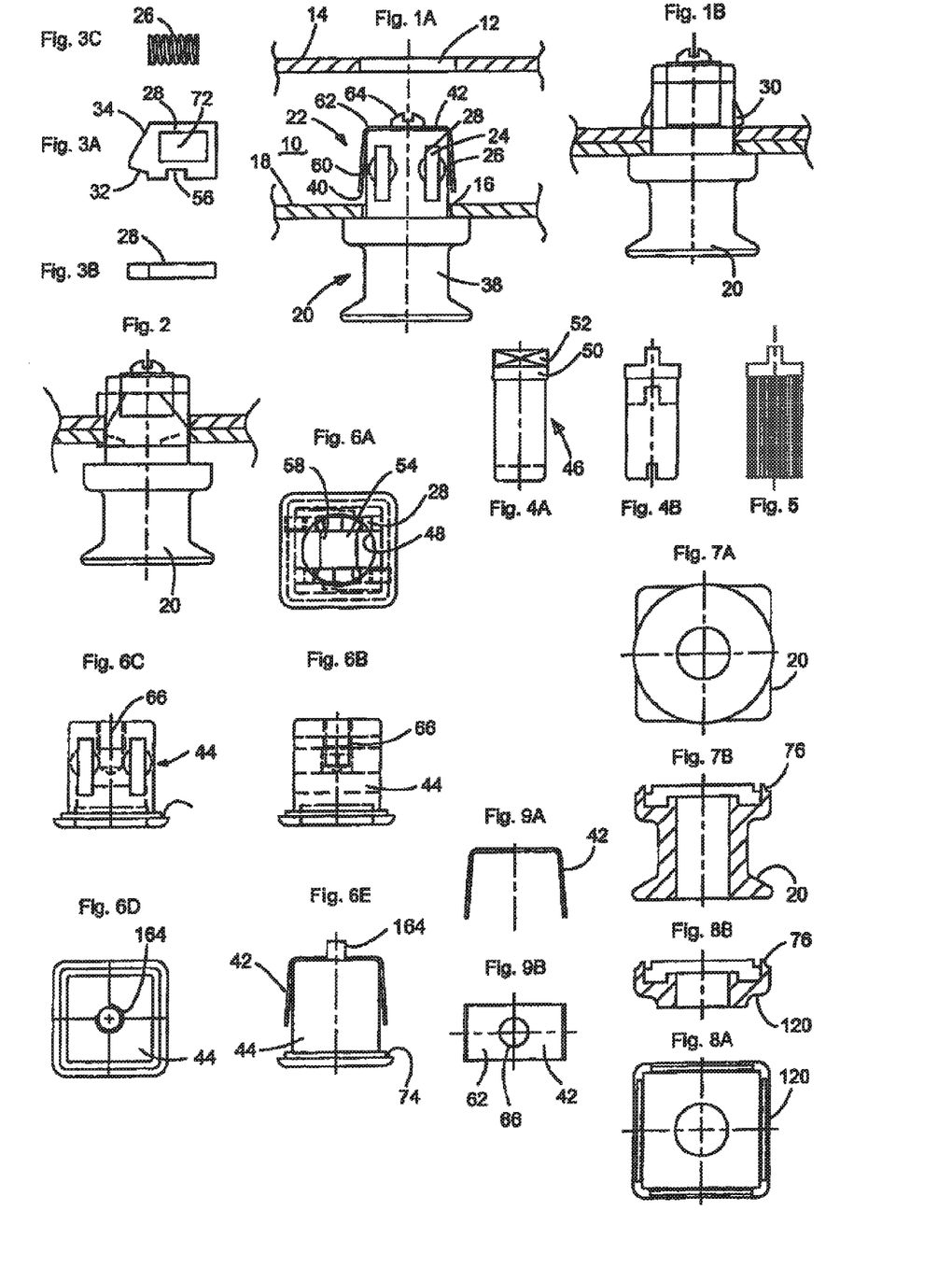
FIG. 1A shows a side view of a snap fastener according to the invention in connection with a front and a rear panel.
FIG. 1B shows a side view rotated by 90° after mounting with the snap fastener.
FIG. 2 shows the open position in a view similar to that in FIG. 1B.
FIGS. 3A to 3C show a side view and a top view of the snap plates, and the spring.
FIG. 4A shows a side view of a long screw driver actuating device.
FIG. 4B shows a side view of a short screw driver actuating device.
FIG. 5 shows a knurled actuating device.
FIG. 6A shows the receptacle for the actuating pin showing the stops for self-locking.
FIG. 6B shows a side view of the arrangement according to FIG. 6A.
FIG. 6C shows a view which is rotated by 90° with respect to FIG. 6B.
FIG. 6E shows a side view of the head part.
FIG. 7A shows a top view of the base part of the arrangement according to FIG. 1A.
FIG. 7B shows a cross-sectional view through the base part of the arrangement according to FIG. 1A.
FIGS. 8A and 8B show corresponding views for an alternative embodiment form.
FIGS. 9A and 9B show two views of the holding spring according to FIG. 6E.

FIG. 1A shows a snap fastener 10 which is suitable for fastening a first thin wall 14 such as a housing wall, door leaf, shutter, or the like, which is provided with a through-opening 12 to a second thin wall 18 such as thin-walled wall supports 18 such as housing frames, door frames, wall opening edge, or the like, which is likewise provided with a through-opening 16, with a base part 20 which can be arranged at the wall support 18 in the through-opening 16 thereof, with a head part 22 extending away from this base part 20, this head part 22 having a diameter 23 and 123, respectively, which initially increases and then decreases again in its longitudinal section from the end of the head part in direction of the base part 20, which head part 22 presents a male plug-in piece which, by overcoming a spring force acting radially outward in direction of the diameter 23, 123, can be received by an undercut female insertion piece which is formed by or supported by the through-opening 12 of the thin wall 14, wherein the head part 22 presents a guide or channel 24 for one or two or more push elements or holding elements 28 which are pressed by at least one spring 26 into a position in which they project over the end of the guide or channel 24, the ends 30 of which push elements or holding elements 28 projecting out of the guide or channel 24 have a triangular shape in a projection line extending perpendicular to the thin wall (see FIG. 1B), wherein a triangular side 32 serves as a holding side and the other side serves as an run-in side 34. The head part 22 is constructed as a housing with fastening projections such as fastening cams (of flexible material) or leaf spring devices 42 having flexible fastening surfaces 40, which housing 44 can be snapped into a through-opening 16 in the thin wall 18 (front panel) in such a way that the leaf spring devices 42 only grip the thin wall (rear panel) 14.

It should be emphasized that the front thin wall 18 as well as the rear thin wall 12 can serve as wall supports, while the other wall would be the supported wall.

Unlocking devices (releasing means) 46 are provided in the housing 44, by means of which unlocking devices the push elements or holding elements can be pulled back into the housing 44. The housing 44 can be unlocked from this wall support or front panel 18. The unlocking devices are accessible from the front (i.e., from the place where the front panel 18 is located). FIG. 6A shows a bottom view of the arrangement according to FIG. 1A and shows a round bearing surface 48 for the annular circumference 50 of the actuating pin 46 from FIG. 4A. The blade-shaped area 52 is exposed until the deeper surface 54 and extends into the recess 56 of the push element 28 so that when rotated (e.g., by 90°, limited by the stops 58) the push element 28 is moved from the position shown in FIG. 1B against the force of spring 26 into the pulled back position indicated by a dashed line in FIG. 2, at which point the holding side 32 of the push element 28 releases the edges of the through-opening 12 in the thin wall (rear panel) 14 so that the snap fastener element 10 slips downward (as in FIG. 2), for example, outward away from the surface of the front panel 18. In this position, the holding surfaces 40 of the fastening projections lie on the panel 18, the holding surfaces 40 in this instance being a U-shaped spring 42 that is secured to the housing 44 by the base 62 of the "U" by means of a clamping screw 64 when screwed into the threaded hole 66. Since the surfaces 40 project away from the housing 44, the head part 22 is securely held in the cutout 16 and accordingly cannot be lost. The snap members, in this case, the push elements or the holding elements 26, are at the same time in the disassembly position (open position) (i.e., the rear panel 14 can be separated from the front panel 18).

If required and when the space behind the rear panel side is accessible, the entire piece can also be removed from the through-opening 16 of the front panel 18 by pressing together the legs of the U-profile of the spring 60, which is an advantage over the prior art in which the screw is secured by riveting the sleeve to the panel.

The U-shaped leaf spring 42 can be attached by its base 62 to a projection 164 and subsequently riveted to the flattened head of the projection 164. To this end, the web area 62 of the U-shaped leaf spring 41 has a bore hole 66 (see FIG. 9B).

Figure 10A:
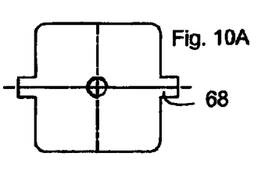
FIGS. 10A and 10B show a first embodiment form of the guide by means of a guide rib.
Figure 10B:
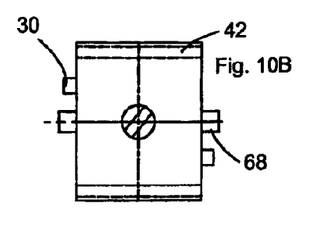
Figure 10C:
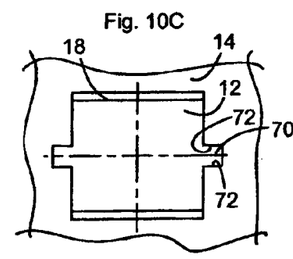
FIG. 10C shows a corresponding sectional view of the panels.
Figure 11A:
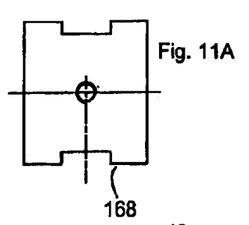
FIGS. 11A and 11B show an alternative embodiment form.
Figure 11B:
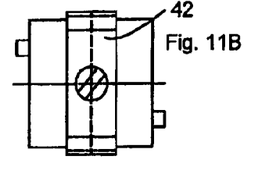
Figure 11C:
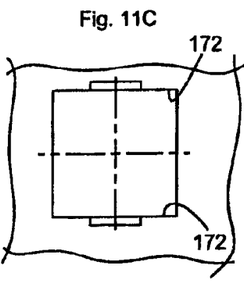
FIG. 11C shows the corresponding panel cutouts.
Figure 12A:
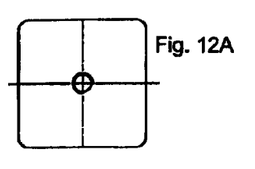
FIGS. 12A and 12B show another embodiment form.
Figure 12B:
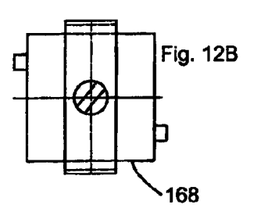
Figure 12C:
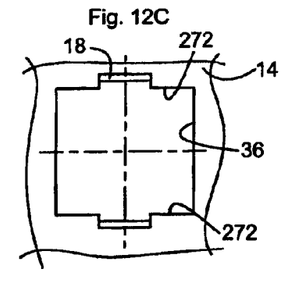
FIG. 12C shows corresponding panel cutouts.

FIGS. 10A and 10B clearly show a first embodiment form in which a guide rib 68 is provided. This guide rib 68 cooperates with a corresponding notch 70 starting from the through-opening 12 in the rear panel wall 14. In this embodiment form 1, the guide surface is accordingly formed by a projection which is shaped by the guide rib. In embodiment form 2, on the other hand, the guide surface is formed by a recess 168. The panel notch 70 accordingly forms the two guide surfaces 72 for the guide rib 68 according to FIG. 10A of embodiment form 1. In embodiment form 2 it is the housing wall 172, while in embodiment form 3 it is 272 so that a special notch 70 is dispensed with in the latter two instances because the walls take over the guiding.

Figure 15A:
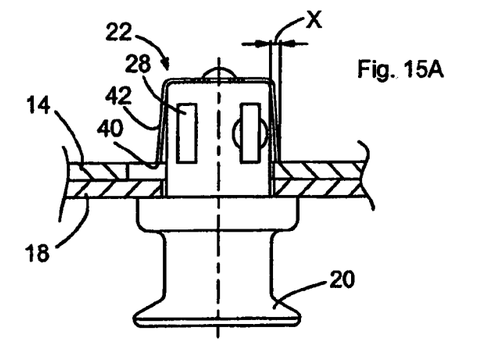
FIGS. 15A to 15C show details relating to clearance.

The guiding ensures that the fastening spring 42 is arranged exactly in the center of the through-opening 12 and accordingly ensures that the plate 14 with its somewhat larger through-opening above it can slide away smoothly over the fastening spring so as to prevent slipping which would prevent access on one side (see FIG. 15A).

Figure 13A:
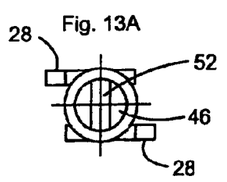
FIG. 13A shows a top view of push elements and pin.
Figure 13B:
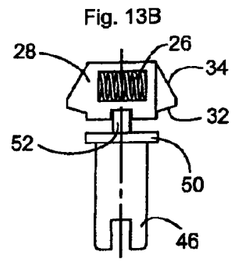
FIG. 13B shows a side view of push elements and pin.
Figure 14A:
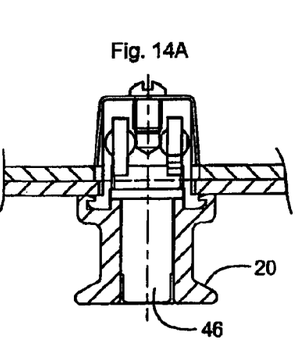
FIGS. 14A and 14B show corresponding views as in FIGS. 1A and 1B of the embodiment form according to FIGS. 12A and 12B.
Figure 14B:
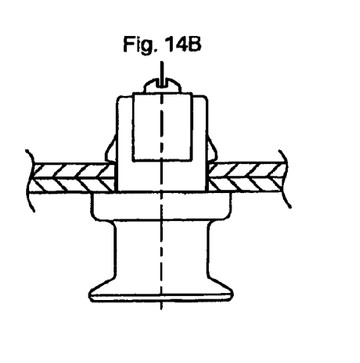

FIGS. 13A and 13B show how the two opposite holding elements 28 are held together with the spring 26 in the cutout 72 and also shows the blade-shaped area 52 of the releasing means 46 which makes it possible for the holding elements 28 to be pulled back into the notches 56 so as to engage therein in that the releasing means 46 are rotated to the right and, therefore, according to FIG. 13A, the upper element 28 is displaced toward the right and the lower element 28 is displaced toward the left and is thus pulled back into the housing body. The arrangement is also shown in FIG. 14A. The unlocking device 46 which is actuated in FIGS. 4A and 4B by a screw driver can also be provided as a knurled knob according to FIG. 5 so that it can be operated by hand.

In the present embodiment form, assembly is carried out as follows: first, the coil spring 26 is inserted into the through-opening 72 of the push element 28 and secured therein (e.g., in that the spring is under compressive tension). The resulting combination of push element 28 and spring 26 which can be manipulated as a unit can be inserted in this form into the respective channel 24 formed by the head part 22. The unlocking device 46 which is subsequently expanded secures this combination (see FIG. 13B) with its area 52 penetrating into the recess 56.

The U-shaped leaf spring 62 is then screwed on or riveted on. Finally, the unlocking part 46 is inserted from the other side and the base part 20, shown in FIGS. 7A and 7B, is fitted to the completed head part 22. According to FIG. 14A, this base part 20 supports the unlocking device 46. The head part 22 and base part 20 can be connected in that a recess 74 for the deformation cooperates with a deformation rib 76 and connects the two parts (see FIGS. 6E, 7B, and 14A).

FIG. 8B shows that the housing cap 120 can also be short for direct actuation by means of a screw driver (i.e., without a handle). A socket wrench with a rear grip can be used so that the front panel can be pulled forward.

Figure 15B:
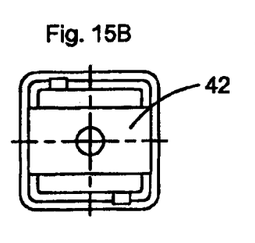
Figure 15C:
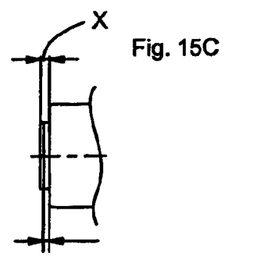

FIGS. 15A to 15C show details relating to clearance. The thin wall 14 is displaced with respect to thin wall 18 in such a way that the leaf spring 42 secures the thin wall 14 with one leg.

Figure 16:
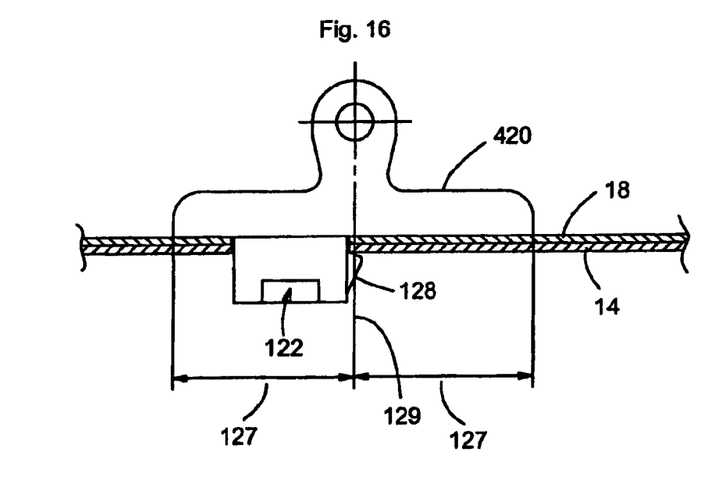
FIG. 16 shows another embodiment form.

In another embodiment form, FIG. 16 shows that one push element 128 can also be sufficient when the base part 420 has a correspondingly wide supporting surface (double lever arm 127 at the clamping point 129 of the push element 128).

Figure 17:
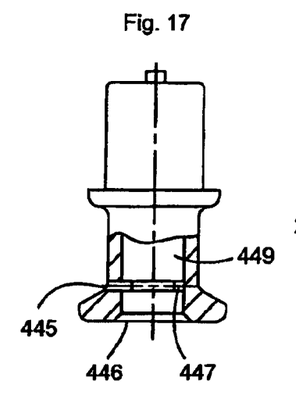
FIG. 17 shows an embodiment form with the head part and base part formed in one piece, with releasing means with a pin in a radial bore hole which secures the shaft of the releasing means by an annular groove.
Figure 18A:
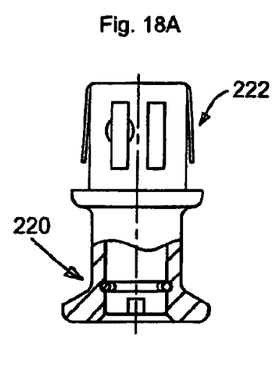
FIGS. 18A to 18E show an embodiment form with the head part and base part formed in one piece, with a spring ring in an annular groove in the base part and in the shaft of the releasing means for securing the releasing means axially in the base part.
Figure 18B:
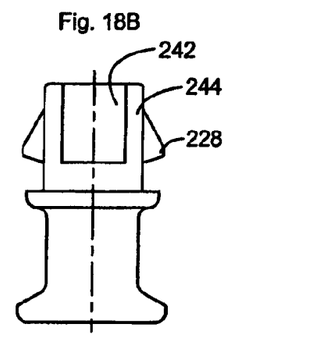
Figure 18C:
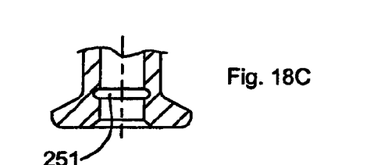
Figure 18D:
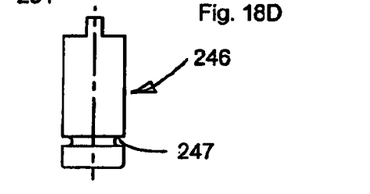
Figure 18E:
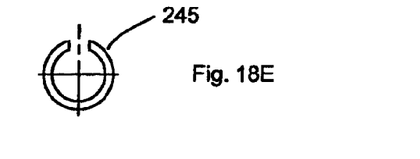

FIG. 17 shows an embodiment form with head part and base part forming one piece and releasing means 446 with a pin 445 in a radial bore hole which secures the shaft 449 of the releasing means axially after assembly by an annular groove 447. The push elements and spring are not shown.

FIGS. 18A to 18E show an embodiment form with head part 222 and base part 220 forming one piece and a spring ring 245 in an annular groove 251 and 247, respectively, in the base part 220 and in the shaft 246 of the releasing means for axially fixing the releasing means in the base part.

When inserted, the ring is deflected into the groove 247, one half of its cross section snapping into the groove 251 when the operating position is reached. The head part with the housing 244 and the spring 242 and base part 220 can be formed of plastic in one piece or by injection molding.

Figure 19A:
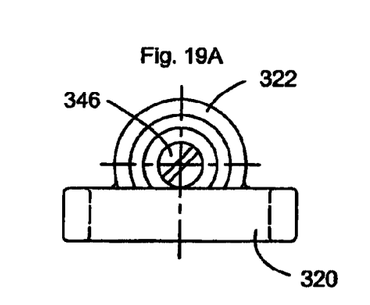
FIGS. 19A to 19B show an embodiment form with a stirrup grip.
Figure 19B:
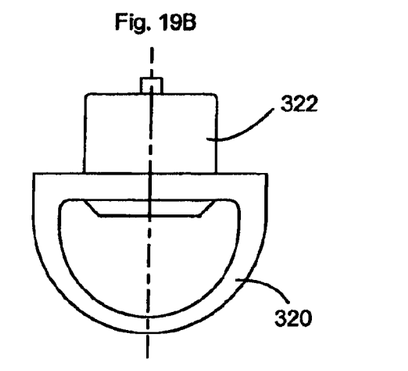

FIGS. 19A to 19B show an embodiment form with a stirrup grip 320 formed integral with it. Again, the push elements and the spring are also not shown. This embodiment form is particularly relevant (e.g., for server drawers which were outfitted heretofore with two captive screws and two finger pull grips). These four parts can be replaced by two snap fasteners according to the invention (FIGS. 19A, 19B).

In the following embodiment forms (see FIGS. 20A to 41C), the two legs 541 of the U-shaped spring 542 remain in alignment with two opposite grooves 543 of the head part 522 so as not to impede the passage of the head part 522 through the square through-opening 512 in the thin wall 14 according to FIGS. 21A to 23. Accordingly, when the holding elements 28 have been unlocked by actuating the releasing means 546, the thin wall 14 (e.g., a panel lining or whatever it may be) can be separated from the snap fastener 510 and, therefore, from the thin wall 18 (e.g., a frame profile) without being impeded by the spring 542.

On the other hand, projections 517 which project into the through-opening 516 and which are contacted by the ends of the legs 541 of the spring 542 ensure that the snap fastener 510 remains in the through-opening 516 and does not fall out. Also, this snap fastener 510 can only be separated from the panel or thin wall 18 by special steps (e.g., by pressing together the legs 541 of the spring 542 by means of suitable pliers until they can be guided past the end faces of the projections 517).

If this safety measure is not required, the U-shaped spring 542 can also be omitted.

Figure 20A:
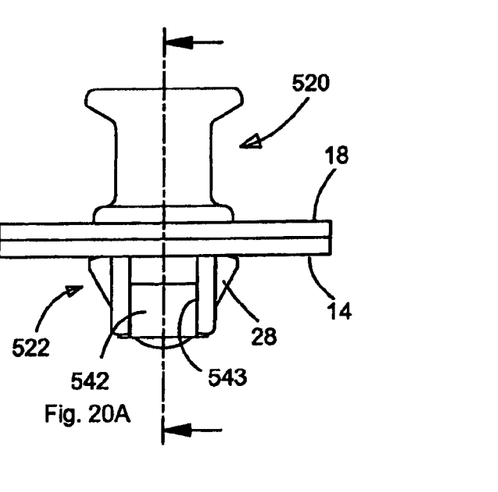
FIG. 20A shows a side view of another embodiment form with a knob grip which can be released by means of a screw driver.
Figure 20B:
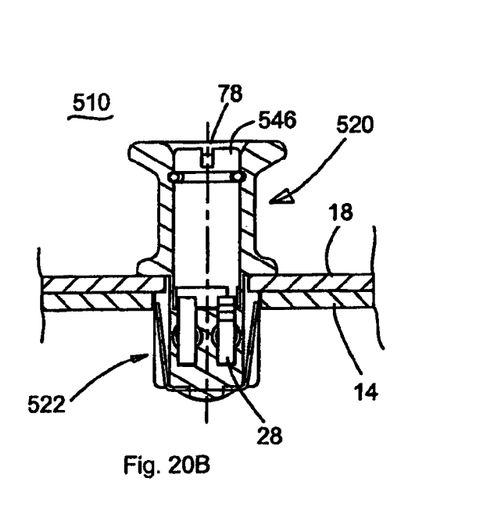
FIG. 20B shows an axial sectional view of the embodiment form in FIG. 20A.
Figure 20C:
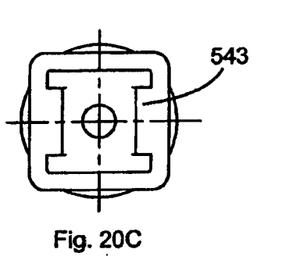
FIG. 20C shows a rear view of the embodiment form in FIG. 20A.
Figure 21A:
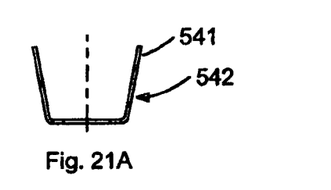
FIGS. 21A and B show two views of an associated U-spring.
Figure 21B:
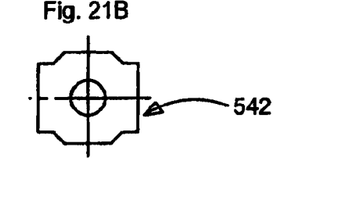
Figures 24A, 25:
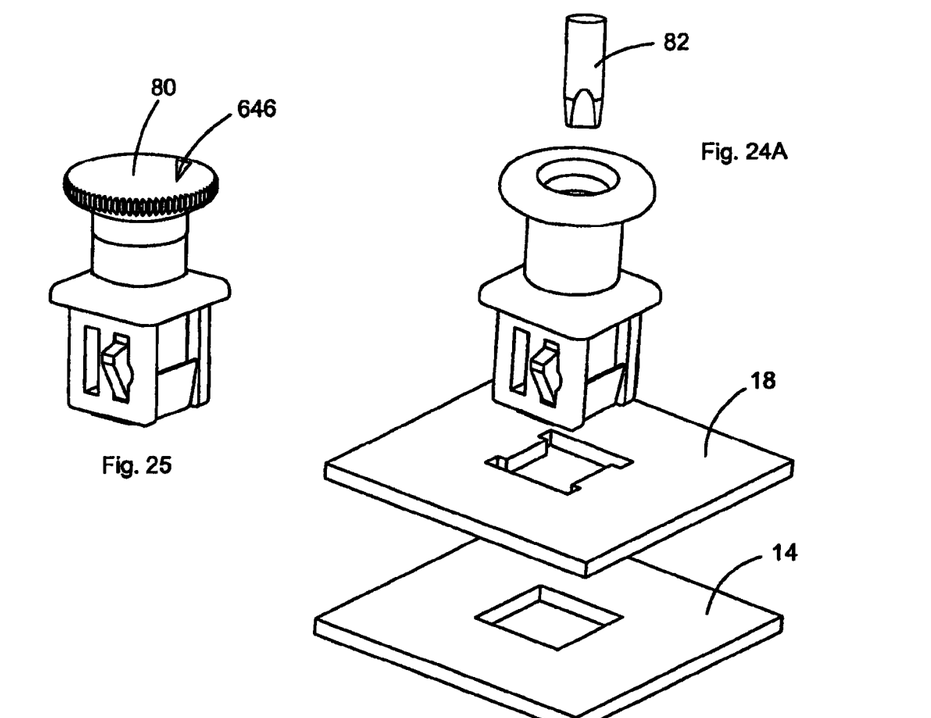
FIG. 24A shows the arrangement shown in FIGS. 20A and B in a perspective view before snapping into the two walls according to FIGS. 22 and 23.
FIG. 24C and FIG. 25 show a perspective view from the bottom and from the top of the arrangement according to FIG. 24A and another embodiment form with a knob grip and knurling for unlocking with the finger.

The holding elements 28 with the unlocking device 546 are pulled back by means of a tool such as a screw driver 82, shown in FIG. 24A, which engages in a slot 78 (see FIG. 20B). According to FIG. 25A, the unlocking device 646 can have a knurled turning knob 80 which can be turned by hand.

Figure 22:
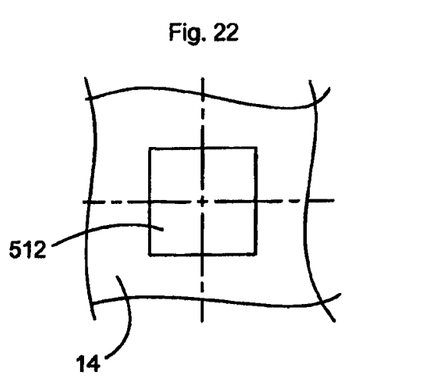
FIG. 22 shows the associated through-opening in the (rear) panel.
Figure 23:
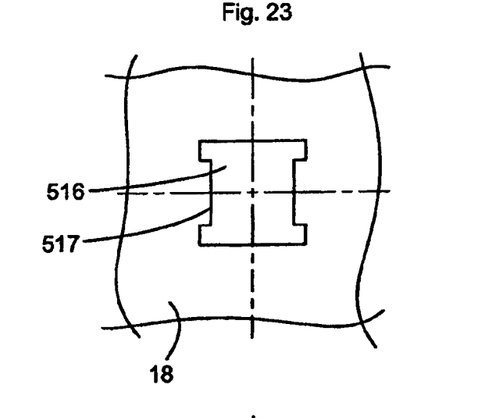
FIG. 23 shows the associated through-opening in the (front) panel.
Figure 24B:
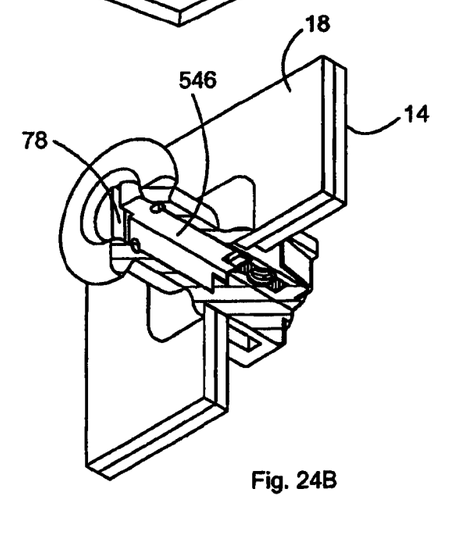
FIG. 24B shows the arrangement of FIG. 24A in a perspective, partially broken-away view after snapping into the two walls according to FIGS. 22 and 23.
Figure 24C:
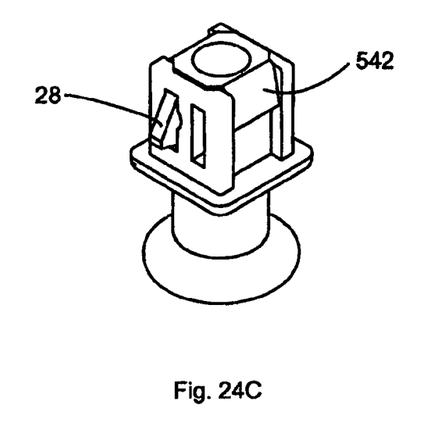

FIG. 24A also shows the arrangement from FIGS. 20A and B in a perspective view prior to snapping into the two walls 14, 18 according to FIGS. 22 and 23. FIG. 24B shows the arrangement from FIG. 24A in a perspective, partly broken-away view after snapping into the two walls 14, 18. FIGS. 24C and 25 show a perspective view from the bottom and top, respectively, of the embodiment form according to FIG. 24A and another embodiment form with a knob handle 80 and knurling for releasing with the finger.

Figure 26A:
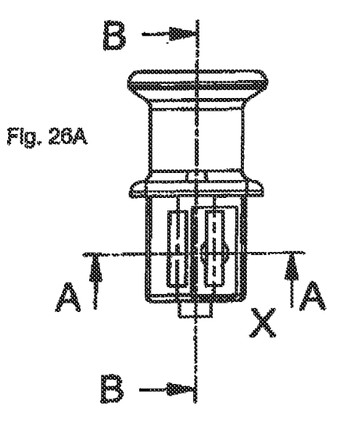
FIGS. 26A, B, and C show a side view, rear view and top view of the arrangement according to FIGS. 24A, B.
Figure 26B:
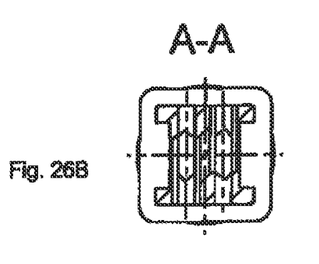
Figure 26C:
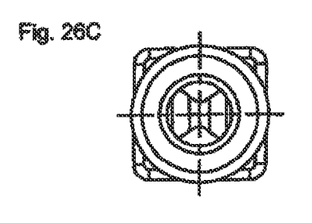
Figure 26D:
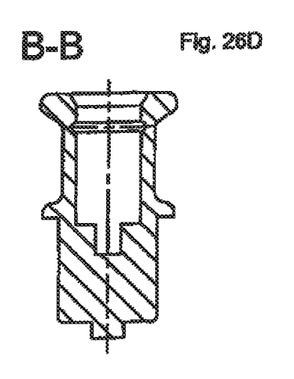
FIG. 26D shows an axial sectional view through the housing of the arrangement according to FIG. 26A.
Figure 26E:
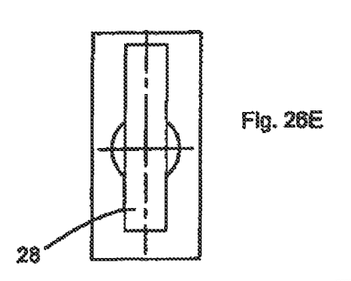
FIG. 26E shows the push element in a magnification of ×5.
Figure 26F:
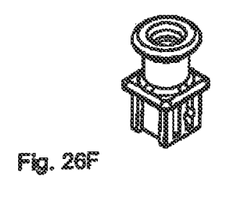
FIG. 26F shows a perspective view in the actual size of the arrangement according to FIG. 26A.
Figure 27A:
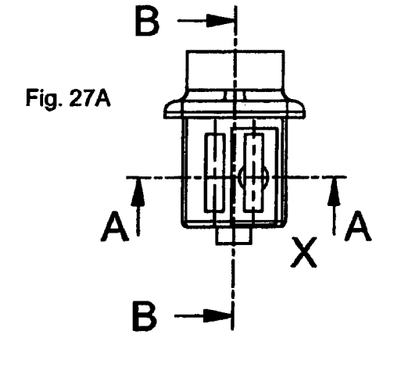
FIGS. 27A to 27F show corresponding view of a shortened embodiment form.
Figure 27B:
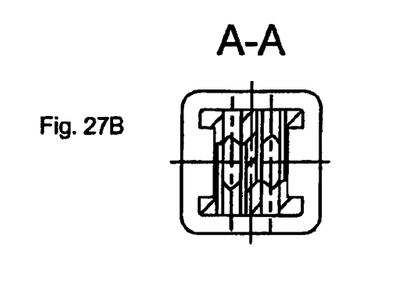
Figure 27C:
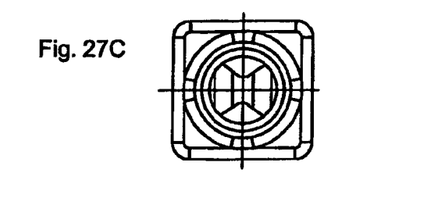
Figure 27D:
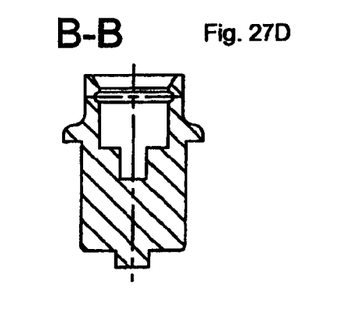
Figures 27E, 27F:
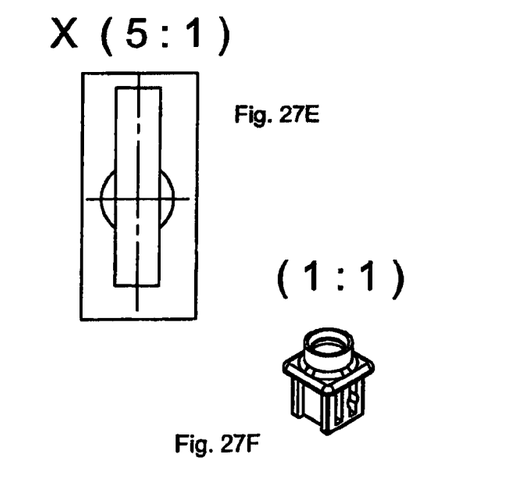

FIGS. 26A, B and C show a side view, a rear view and a top view, respectively, of the arrangement according to FIGS. 24A, B. FIG. 26D shows an axial sectional view through the housing of the arrangement according to FIG. 26A. FIG. 26E shows the associated push element 28 in a magnification of ×5. FIG. 26F shows a perspective view of the arrangement according to FIG. 26A in its actual size.

Figures 28A, 29A:
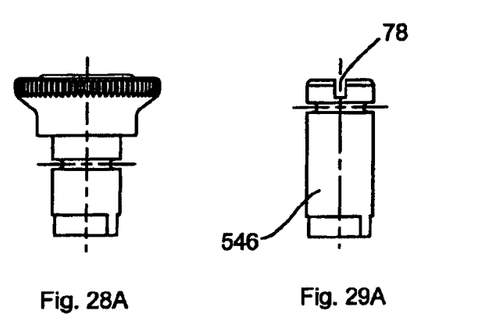
FIGS. 28A to C show three different views of the releasing part with knurling.
FIGS. 29A to C show corresponding views of the releasing part with a slot for a screw driver.
Figure 28B:
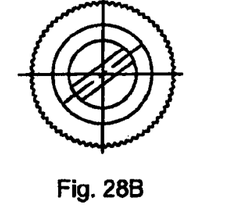
Figure 28C:
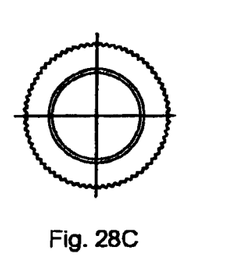

FIGS. 27A to 27F show corresponding views of a shortened embodiment form in which the head is knurled according to the three views in FIGS. 28A to C.

Figures 29B, 30A:
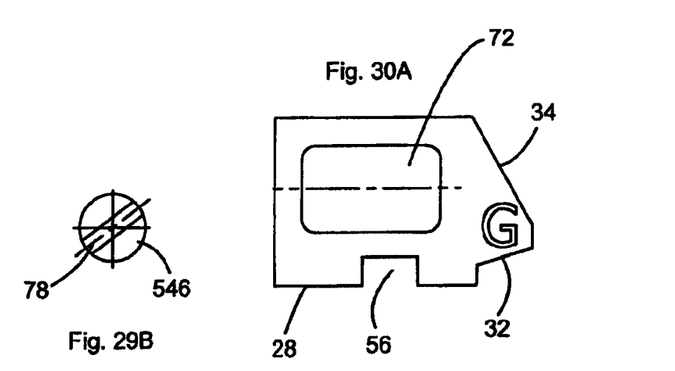
FIGS. 30A and 30B show two enlarged views of the push element.
Figure 29C:
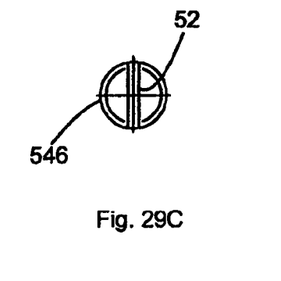

On the other hand, the insert 546, a releasing part with a slot for a screw driver, according to the three views in FIGS. 29A to C is suitable for the embodiment form according to FIGS. 24A to C.

Figure 30B:
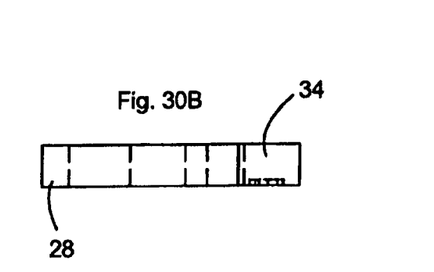
Figure 31:
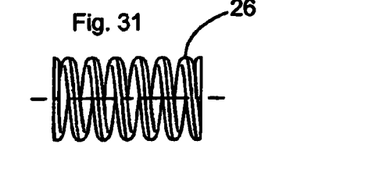
FIG. 31 shows a side view of the coil spring fitting the push element of FIG. 30A.

FIGS. 30A to 30B show two enlarged views of the push element 28. FIG. 31 shows a side view of the coil spring 26 suited to the push element in FIG. 30A.

Figure 32A:
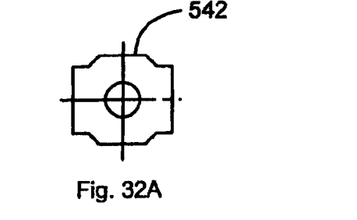
FIGS. 32A and B show two views of the U-shaped fastening spring.
Figure 32B:
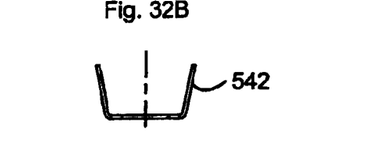

FIGS. 32A and B show two views of the U-shaped fastening spring 542 associated with the embodiment form shown in FIG. 24A.

Figures 33A, 33B, 33C, 33D, 33E, 33F, 33G, 33H, 33I, 33J, 34, 35, 36:
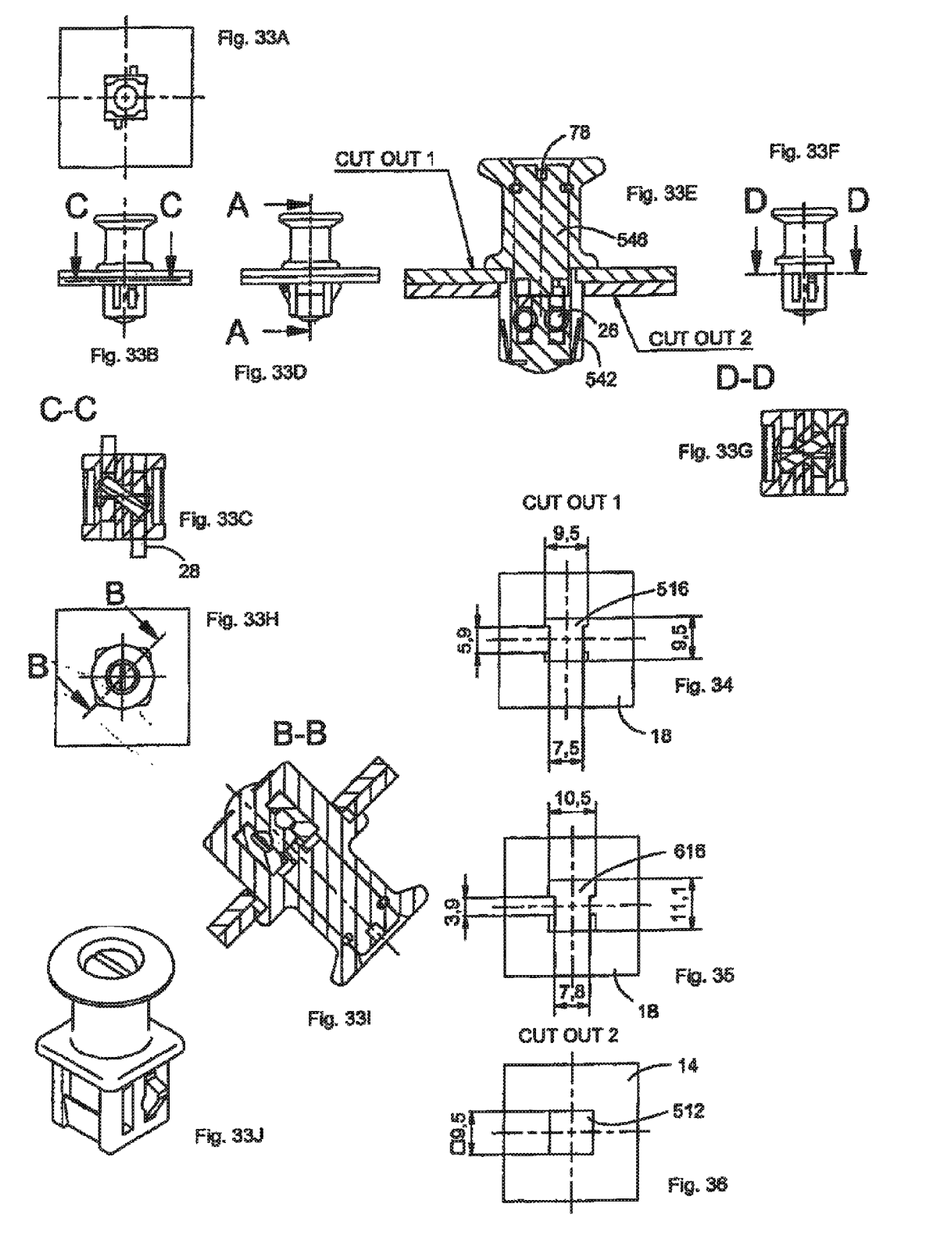
FIG. 33A shows a rear view.
FIG. 33B shows a side view.
FIG. 33C shows an enlarged sectional view along line C-C of FIG. 33B.
FIG. 33D shows a side view rotated by 90 degrees with respect to FIG. 33B.
FIG. 33E shows an enlarged sectional view along line A-A of FIG. 33D, another embodiment form in closed position, indicating cut outs 1 and 2 shown in detail in FIGS. 34 and 35.
FIG. 33F shows the arrangement according to FIG. 33B, but in the open position.
FIG. 33G shows an enlarged sectional view along section line D-D of FIG. 33F in the open position.
FIG. 33H shows a top view of the arrangement of FIG. 33B.
FIG. 33I shows an axial enlarged sectional view along section line B-B of FIG. 33H.
FIG. 33J shows an enlarged perspective view of the arrangement according to FIG. 33B.
FIG. 34 shows cut out 1 from FIG. 33E for the outer thin wall without compensating tolerances.
FIG. 35 shows cut out 2 from FIG. 33E for the outer thin wall with compensating tolerances.
FIG. 36 shows the associated cutout in the inner thin wall.
Figure 37A:
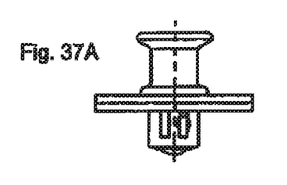
FIGS. 37A to D show different views of an embodiment form with a cross-slot opener.
Figure 37B:
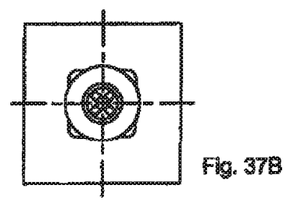
Figure 37C:
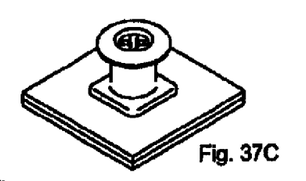
Figure 37D:
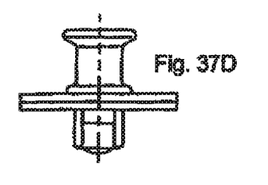

FIG. 33A shows a rear view, FIG. 33B shows a side view, and FIG. 33C shows an enlarged sectional view along line C-C from FIG. 33B. FIG. 33D shows a side view which is rotated by 90° with respect to FIG. 33B. FIG. 33E shows an enlarged sectional view along line A-A of FIG. 33D of another embodiment form in closed position. FIG. 33F shows the arrangement according to FIG. 33B, but in the open position. FIG. 33G shows an enlarged sectional view along section line D-D from FIG. 33F in the open position. FIG. 33H shows a top view of the arrangement from FIG. 33B. FIG. 33I shows an axially enlarged sectional view along section line B-B from FIG. 33H. FIG. 33J shows an enlarged perspective view of the arrangement according to FIG. 33B. FIGS. 34 and 35 show associated cutouts 516, 616 for the outer thin wall 18 without (cutout 516) and with (cutout 616) compensating tolerances. FIG. 36 shows the associated square cutout 512 in the inner thin wall 14.

The cutout 616 allows a mutual clearance of the two walls 14 and 18 (e.g., by two-times 0.6 mm according to the specifications in FIGS. 35 and 36 in one direction and two-times 0.5 mm in the direction perpendicular thereto).

Figures 38A, 38B:
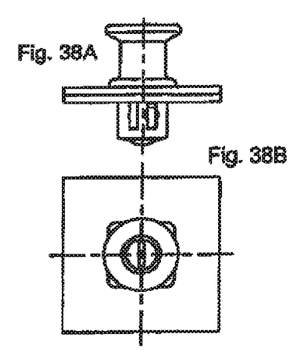
FIGS. 38A to C show different views of an embodiment form with a slotted opener.
Figure 38C:
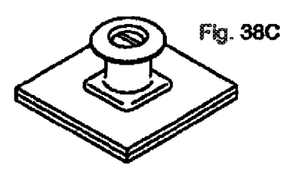
Figure 39A:
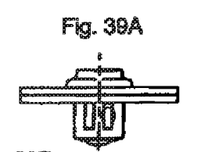
FIGS. 39A to C show different views of an embodiment form with a shortened slotted opener.
Figure 39B:
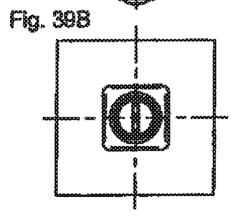
Figure 39C:
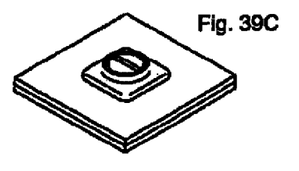
Figure 40A:
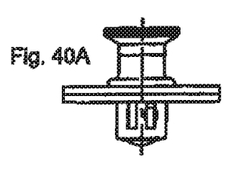
FIGS. 40A to D show different views of an embodiment form with a knurled knob hand-operated opener.
Figure 40B:
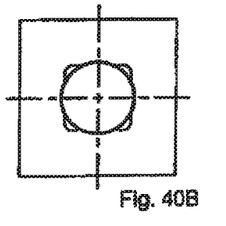
Figure 40C:
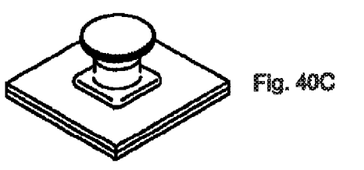
Figure 40D:
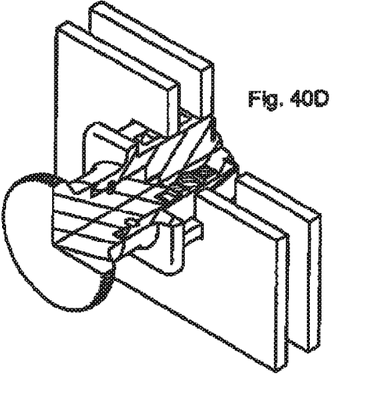
Figure 41A:
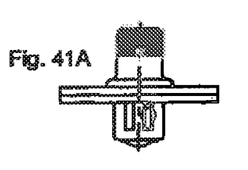
FIGS. 41A to C show different views of an embodiment form with alternative knurled knob hand-operated opener.
Figure 41B:
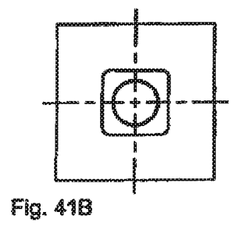
Figure 41C:
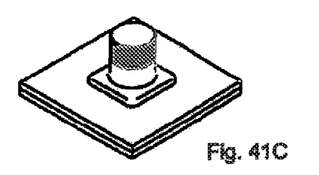

FIGS. 37A to D show different views of an embodiment form with a cross-slot opener. FIGS. 38A to C show different views of an embodiment form with a slotted opener. FIGS. 39A to C show different views of an embodiment form with a short slotted opener. FIGS. 40A to D show different view of an embodiment form with a hand-operated knurled knob opener. FIGS. 41A to C show different views of an embodiment form with an alternative hand-operated knurled knob opener.

The drawings show the versatility of the snap fastener according to the invention.

INDUSTRIAL APPLICABILITY

The invention is industrially applicable in switch cabinet construction.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMBERS 10, 510 snap fastener
12, 512 through-opening
14 thin wall
16, 516, 616 through-opening
517 projection
18 thin wall, front panel
20, 120, 220, 320, 420, 520 base part, grip
22, 122, 222, 322, 522 head part
23, 123 diameter
24 guide, channel
26 spring
127 lever arm
28, 128 push element, holding element
129 clamping point
30 projecting end
32 holding side
34 run-in side
36 longitudinal edge
38 plate
40 fastening surfaces
541 leg
42, 242 leaf spring devices
543 groove
44, 244 housing
245, 445 pin, spring ring
46, 246, 446, 546, 646 unlocking devices, releasing means
247 annular groove
48 bearing surface
50 annular circumference
251 annular groove
52 blade-shaped area
54 deeper surface
56 recess
58 stops
60 fastening projections
62 U-base
64, 164 screw, projection
66 bore hole
68, 168, 268 guide rib, projection, recess
70 notch
72 guide surface
74 recess for deformation
76 deformation rib
78 slot
80 turning knob
82 screw driver

The invention claimed is:

1. A snap fastener which is configured to secure a first thin wall having a through-opening to a second thin wall similarly having a through-opening, the snap fastener comprising:
   a base part which is configured to be arranged at the first thin wall in the through-opening thereof; and
   a head part extending away from the base part, the head part having a diameter which initially increases and then decreases in its longitudinal section from an end of the head part in a direction of the base part; and
   an unlocking device;
   wherein the head part comprises:
      a male plug-in piece which, by overcoming a spring force acting radically outward in a direction of the diameter of the head part, is configured to be received by an undercut female insertion piece which is formed by or supported by the through-opening of the first thin wall; and
      a guide or a channel, in which a push element or a holding element is arranged, the push element or holding element being pressed by at least one spring into a position in which the push element or holding element projects over an end of the guide or channel;
   wherein an end of the holding element or push element which projects out of the guide or the channel has a triangular shape in a projection line extending perpendicular to the first thin wall when the snap fastener is arranged in the through-opening of the first thin wall;

wherein the base part includes a plate which overlaps longitudinal edges of the through-opening in the first thin wall when the snap fastener is arranged in the through-opening of the first thin wall;

wherein the head part is provided as a housing with fastening projections, where the housing is configured to be snapped into the through-opening in the first thin wall in such a way that it grips only the first thin wall;

wherein, by means of the unlocking device, the push element or holding element is configured to be pulled back into the housing from the front, and the housing is configured to be disengaged from the second thin wall; and wherein a first distance between a holding area of the fastening projections, which is configured to grip the first thin wall, and a supporting plane of the base part, which supports the base part on the thin walls when the snap fastener is arranged in the through-openings of the thin walls, and a second distance between a holding area of the push element or holding element, which is configured to grip the second thin wall, and the supporting plane of the base part, are selected in such a way that the fastening projections are configured to lie on the first thin wall with clearance, when the push element or holding element is pulled back and the snap fastener is arranged in the through-openings of the thin walls.

2. The snap fastener according to claim 1;
wherein the unlocking device locks in an open position; and
wherein the fastening projections are provided by a U-shaped leaf spring comprising:
  two legs, each of which forms one of the fastening projections; and
  a bar which connects the two legs to each other at one end of each of the two legs so as to form the U-shape;
  wherein the other end of each of the two legs provides the holding area for the respective fastening projection, the other end also providing support for the first thin wall when the snap fastener is arranged in the through-opening of the first thin wall; and
  wherein the bar is connected to an end of the head part or an end of the housing.

3. The snap fastener according to claim 1;
wherein the clearance corresponds at least to a thickness of the second thin wall to be secured to the first thin wall.

4. The snap fastener according to claim 1;
wherein the housing includes guide projections or guide recesses which, when the snap fastener is being arranged in the through-openings of the first and second thin walls, cooperate with guide surfaces, formed by the through-openings in the first and second thin walls, to align the thin walls.

5. The snap fastener according to claim 1;
wherein the housing includes guide projections or guide recesses which, when the snap fastener is being arranged in the through-openings of the first and second thin walls, cooperate with guide surfaces, formed by the through-openings in first and second thin walls, which lie parallel with the movement direction of the push or holding element, to align the thin walls.

6. The snap fastener according to claim 1;
wherein the housing includes guide projections which, when the snap fastener is being arranged in the through-openings of the first and second thin walls, cooperate with guide surfaces, formed by the through-openings in first and second thin walls, which lie parallel with the movement direction of the push or holding element, to align the thin walls; and
wherein the guide projections of the housing are formed by a guide rib.

7. The snap fastener according to claim 1;
wherein the housing includes guide projections which, when the snap fastener is being arranged in the through-openings of the first and second thin walls, cooperate with guide surfaces, formed by the through-openings in first and second thin walls, which lie parallel with the movement direction of the push or holding element, to align the thin walls; and
wherein the guide projections of the housing are formed by a recess or groove.

8. The snap fastener according to claim 1;
wherein the housing includes guide projections which, when the snap fastener is being arranged in the through-openings of the first and second thin walls, cooperate with guide surfaces, formed by the through-openings in first and second thin walls, which lie parallel with the movement direction of the push or holding element, to align the thin walls; and
wherein the guide projections of the housing are formed by a side wall of the housing.

9. The snap fastener according to claim 1;
wherein the unlocking device comprises an actuating pin which is rotatably mounted in the base part.

10. The snap fastener according to claim 9;
wherein the actuating pin has a receptacle for an actuating tool.

11. The snap fastener according to claim 9;
wherein the actuating pin comprises a knurled actuating device.

12. The snap fastener according to claim 9;
wherein the actuating pin forms a blade.

13. The snap fastener according to claim 1;
wherein the base part forms a grip.

14. The snap fastener according to claim 1;
wherein the base part includes a deformation portion which is deformed, in a state where the base part and the head part are connected, as opposed to a state where the base part and the head part are not connected, so as to be arranged in a recess of the head part.

15. The snap fastener according to claim 1;
wherein the base part and head part are injection molded in one piece from plastic.

16. The snap fastener according to claim 1;
wherein the fastening projections have a U-shape which engages around the head part, and the U-shape is screwed or riveted to the head part.

17. The snap fastener according to claim 1;
wherein only one push element is provided, and the one push element is arranged in the center of the head part.

18. The snap fastener according to claim 1;
wherein the fastening projections are arranged at the head part in such a way that they do not extend beyond a line of alignment of the head part.

19. The snap fastener according to claim 18;
wherein the fastening projections are arranged at the head part in two opposite grooves, the two opposite grooves extending perpendicular to a plane of the second thin wall when the snap fastener is arranged in the through-opening in the second thin wall; and wherein a cross section of each groove is arranged in such a way that, when the snap fastener is arranged in the through-opening in the second thin wall, projections formed by or supported by the second thin wall, to be secured to the first thin wall, project into each groove cross section when the head part is slid into the through-opening formed by the second thin wall.

20. The snap fastener according to claim 19;

wherein the projections formed by or supported by the second thin wall proceed from the edges of the through-opening of the second thin wall.

21. The snap fastener according to claim 19;

wherein the projections formed by or supported by the second thin wall are configured to be received in each groove with lateral play.

\* \* \* \* \*